Jan. 26, 1965     L. PEMBERTON     3,167,054

BULL CONTROL

Filed Nov. 13, 1963

INVENTOR
Leonard Pemberton
BY Peck & Peck
ATTORNEYS 3,167,054
BULL CONTROL
Leonard Pemberton, Rte. 5, Harrison, Ark.
Filed Nov. 13, 1963, Ser. No. 323,506
1 Claim. (Cl. 119—142)

This invention relates broadly to the art of restraining devices for bulls and in its more specific aspects it relates to such restraining or control devices which prevent butting between bulls and also prevents the bull which is equipped with one of my devices from butting and damaging doors, gates, fences and the like; and the nature and objects of the invention will be readily recognized and understood by those skilled in the arts to which it relates in the light of the following explanation and detailed description of the accompanying drawings illustrating what I at present believe to be preferred embodiments or mechanical expressions of our invention from among various other forms, arrangements, combinations and constructions, of which the invention is capable within the spirit and scope thereof.

I have devised a bull control device which is simple in its construction and operation, relatively easy to attach in operative position on the bull's head and is economical to produce and involves no working parts which are apt to get out of order in use.

The invention has been developed so that it is applicable with facility to bulls which do have horns and also to bulls which do not have horns. Fundamentally, my invention involves apparatus which is loosely mounted on the bull's head and comprises elements which when pressed against the bull's head in any type of butting operation causes pain to the bull. However, I have so arranged and coordinated the attachment of my device in operating position on a bull's head that in normal non-butting position it will not cause pain to the bull nor will it produce sore spots or the like on the bull's head.

It will be recognized from the aforementioned comments and the detailed description of the accompanying drawings that the bull control will prevent fighting between bulls and will also prevent bulls from causing damage to doors, gates or fences and the like.

One of the many advantageous features of my development is the arrangement whereby all of the operating parts of my pain-producing elements are exposed so that the pain produced thereby will not only be applied to the animal wearing the device but also to an animal with whom he may be fighting even though the latter animal is not provided with one of my bull control devices. As far as I am aware, all prior devices only subjected the animal to which the device is applied to the pain produced thereby. The desirability of such arrangement will be evident so that I have produced a definite advance in the art.

With the foregoing features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
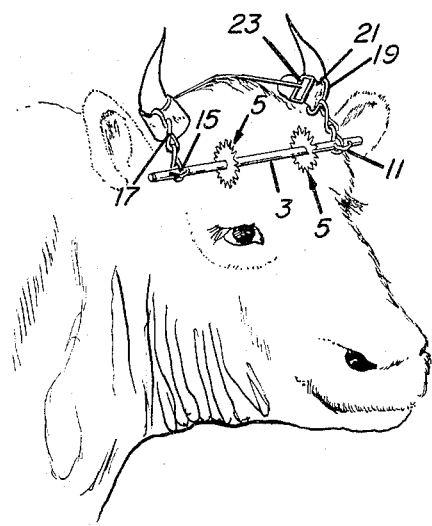
FIG. 1 is a perspective view of a bull's head with my bull control device operatively fastened to the horns of the bull.

In the accompanying drawings I have used the numeral 1 to designate in its entirety the bull control device of this invention. This device comprises a rigid rod 3 which preferably, though not necessarily, is on the order of 11 inches in length and 3/8 inch in diameter. I have found from my experience that a rod of these approximate dimensions will adequately fit and be operative on bulls whose heads are differing sizes. Welded or otherwise affixed to this rod in spaced relation thereon and inwardly spaced from each end thereof are a pair of, what I shall term pain-producing elements, which I have designated in their entirety by the numeral 5. Each such pain-producing element 5 is of circular configuration having a central opening 7 therein through which the rod 3 extends and, as pointed out above, is welded or otherwise secured to the pain-producing element. Each pain-producing element 5 is provided with a serrated periphery which forms a plurality of pointed prongs or the like 9 so that each element 5 comprises, in effect, a plurality of points 9, which, as will be explained when pressed against the bull's head will cause pain, and stop the butting activities of the animal.

Adjacent to but inwardly spaced from each end of the rod 3 I weld or otherwise suitably secure an eye or loop 11 through which is threaded a chain designated in its entirety by the numeral 13, the chain consisting of two twisted links 15 and 17, to the end link is fastened a flat link 19. I thread a strap 21 through each flat link 19, and each strap 21 is provided with a buckle 23.

In the form of the invention illustrated in FIG. 1 of the drawings, where the control device is fastened to the horns of the animal, the straps are wound about each horn and buckled and are held together by a wire cable or the like 25 which extends across the animal's head between the horns and is connected to each buckle.

It will now be appreciated that the arrangement of chains and straps permits the device to swing freely from the horns which prevents the pain-inflicting elements 5 from wearing sore spots on the animal's head.

Figure 2:
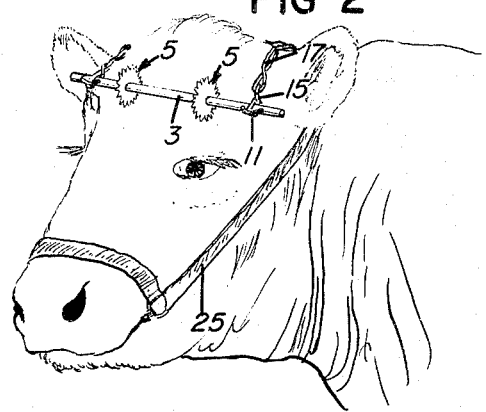
FIG. 2 is a perspective view illustrating a bull's head with my bull control device operatively positioned on the bull's head and attached thereto by means of a halter.
Figure 4:
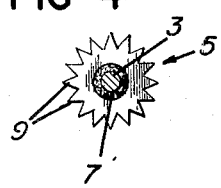
FIG. 4 is a view taken on the line 4—4 of FIG. 3 and specifically illustrating one of the pain-producing spurs.
Figure 3:
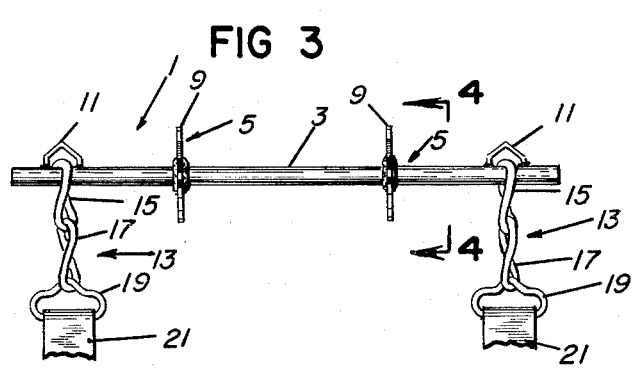
FIG. 3 is a view of the bull control device with parts of the attaching means therefor broken away.

In FIG. 2 of the drawings I have illustrated my control device in position on a bull which does not have horns. In this form of my invention the straps 21 and buckles 23 may be attached to a halter 25 in any suitable manner and the same results as those obtained in the horn fastened device will be produced.

It will now be recognized that I have provided a bull control device which inflicts pain on the bull or the like animal when he butts against another bull or animal or against doors, fences and the like to cause him to stop such activities. It will be further understood that the pain-inflicting elements are all exposed in operative position so that a bull who may not be wearing the control will still have pain inflicted upon him when butting a bull who is wearing the device.

I claim:

A bull control device comprising a rigid rod adapted to extend transversely across the head of a bull, pain-inflicting means fixed to said rod, and said pain-inflicting means being provided with pain-inflicting elements in engagement with the head of the bull and with further pain-inflicting elements directed outwardly and away from the bull's head, and said pain-inflicting means comprising circular elements having a continuous series of peripheral points extending circumferentially thereabout, and means for loosely connecting said bull control device to the head of a bull.

References Cited by the Examiner
UNITED STATES PATENTS

| | | | |
|---|---|---|---|
| 1,032,478 | 7/12 | Guffin | 119—130 |
| 1,214,927 | 2/17 | Knittel | 119—130 |
| 1,517,140 | 11/24 | Yodar | 119—142 |
| 2,566,437 | 9/51 | Warmann | 119—142 |

SAMUEL KOREN, *Primary Examiner.*

HUGH R. CHAMBLEE, ALDRICH F. MEDBERY,
*Examiners.*